(12) United States Patent
Kameyama et al.

(10) Patent No.: US 12,072,711 B2
(45) Date of Patent: Aug. 27, 2024

(54) TRAVEL ROUTE CONTROL OF AUTONOMOUS WORK VEHICLE USING GLOBAL NAVIGATION SATELLITE SYSTEM

(71) Applicant: Honda Motor Co., Ltd., Tokyo (JP)

(72) Inventors: Naoki Kameyama, Saitama (JP); Takahide Konchi, Saitama (JP); Jin Nishimura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 292 days.

(21) Appl. No.: 17/537,488

(22) Filed: Nov. 30, 2021

(65) Prior Publication Data
US 2023/0168678 A1 Jun. 1, 2023

(51) Int. Cl.
| | |
|---|---|
| *G05D 1/02* | (2020.01) |
| *A01D 34/00* | (2006.01) |
| *G05D 1/00* | (2006.01) |
| *A01D 34/78* | (2006.01) |
| *A01D 69/02* | (2006.01) |
| *A01D 101/00* | (2006.01) |

(52) U.S. Cl.
CPC ......... *G05D 1/0214* (2013.01); *A01D 34/008* (2013.01); *G05D 1/0278* (2013.01); *A01D 34/78* (2013.01); *A01D 69/02* (2013.01); *A01D 2101/00* (2013.01)

(58) Field of Classification Search
CPC .............. G05D 1/0214; G05D 1/0278; G05D 2201/0208; A01D 34/008; A01D 34/78; A01D 69/02; A01D 2101/00
See application file for complete search history.

(56) References Cited

U.S. PATENT DOCUMENTS

| | | | |
|---|---|---|---|
| 10,568,258 B2 | 2/2020 | Wahlgren | |
| 10,591,931 B1 * | 3/2020 | Aggarwal | ............ G05D 1/0214 |
| 10,942,510 B2 | 3/2021 | Ko et al. | |
| 11,073,827 B2 | 7/2021 | Ko et al. | |

(Continued)

FOREIGN PATENT DOCUMENTS

| | | |
|---|---|---|
| CN | 110568849 | 12/2019 |
| EP | 3494769 | 6/2019 |

(Continued)

*Primary Examiner* — Mary Cheung
(74) *Attorney, Agent, or Firm* — JCIPRNET

(57) ABSTRACT

An autonomous work vehicle including a positioning information obtaining unit including a GNSS receiver acquiring a position of the autonomous work vehicle, a driving unit including a motor, a memory storing position coordinates used to establish an entry avoidance zone, and a control unit including a processor. The control unit is configured to function as a zone entry judgement unit determining whether the autonomous work vehicle has approached the entry avoidance zone, and a zone entry validation unit determining whether the determination by the zone entry judgement unit that the autonomous work vehicle has approached the entry avoidance zone is valid. When the zone entry judgement unit determines that the autonomous work vehicle has approached the entry avoidance zone, and the zone entry validation unit determines that the determination by the zone entry judgement unit is valid, the control unit controls the autonomous work vehicle to perform an avoidance maneuver.

12 Claims, 14 Drawing Sheets

(56) References Cited

U.S. PATENT DOCUMENTS

| | | | |
|---|---|---|---|
| 11,492,010 B2* | 11/2022 | Furukawa | B60W 60/00272 |
| 2016/0116912 A1* | 4/2016 | Nehmadi | G05D 1/0022 |
| | | | 701/2 |
| 2019/0025838 A1* | 1/2019 | Artes | G05D 1/0044 |
| 2020/0088534 A1* | 3/2020 | Nakirikanti | G06F 16/906 |
| 2020/0146211 A1 | 5/2020 | Wahlgren | |
| 2020/0356088 A1 | 11/2020 | Schlacks, IV et al. | |
| 2021/0148084 A1* | 5/2021 | Ashby | E02F 3/434 |
| 2021/0201662 A1* | 7/2021 | Oyama | G01C 21/3804 |
| 2021/0223793 A1 | 7/2021 | Tian et al. | |
| 2022/0309932 A1* | 9/2022 | Pokorny | G08G 5/0091 |

FOREIGN PATENT DOCUMENTS

| | | |
|---|---|---|
| JP | 6240384 | 11/2017 |
| WO | 2020122583 | 6/2020 |
| WO | 2021014117 | 1/2021 |
| WO | 2021034257 | 2/2021 |

\* cited by examiner

TRAVEL ROUTE CONTROL OF AUTONOMOUS WORK VEHICLE USING GLOBAL NAVIGATION SATELLITE SYSTEM

BACKGROUND OF THE DISCLOSURE

Technical Field

The disclosure relates to travel route control of an autonomous work vehicle, and more specifically relates to travel route control of the autonomous work vehicle using a global navigation satellite system (GNSS).

Related Art

Conventionally, an area wire is disposed on a ground or lawn to delineate a working area of the autonomous work vehicle, such as a robotic lawn mower. The area wire may delineate the working area of the autonomous work vehicle, and reduce an entry of the autonomous work vehicle into an entry avoidance zone.

For example, when a party or a sporting event is conducted in a predetermined area, it may be undesirable for the autonomous work vehicle to approach the predetermined area to prevent distraction or a person's attention transferring to the autonomous work vehicle during a conversation or the sporting event. Accordingly, the predetermined area may be set to the entry avoidance zone using the area wire or using fencing.

However, rearranging the area wire or the fence for each event requires time and cost. Therefore, a way for easily delineating the entry avoidance zone of the autonomous work vehicle is needed.

SUMMARY

According to an embodiment of the disclosure, an autonomous work vehicle includes a positioning information obtaining unit including a GNSS receiver acquiring a position of the autonomous work vehicle, a driving unit including a motor, a memory storing position coordinates used to establish an entry avoidance zone, and a control unit including a processor. The control unit is configured to function as a zone entry judgement unit determining whether the autonomous work vehicle has approached the entry avoidance zone, and a zone entry validation unit determining whether the determination by the zone entry judgement unit that the autonomous work vehicle has approached the entry avoidance zone is valid. When the zone entry judgement unit determines that the autonomous work vehicle has approached the entry avoidance zone, and the zone entry validation unit determines that the determination by the zone entry judgement unit is valid, the control unit controls the autonomous work vehicle to perform an avoidance maneuver.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
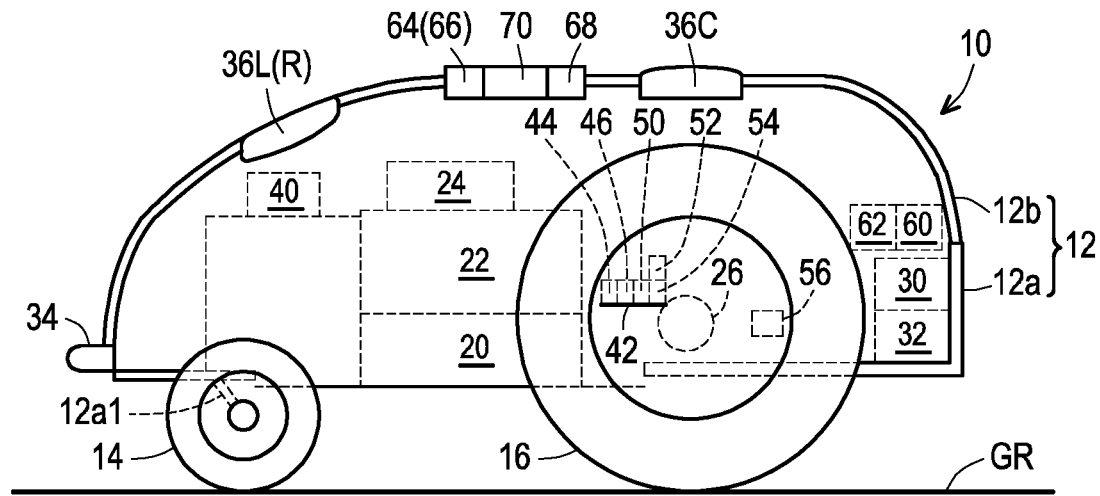
FIG. 1 is an overall schematic diagram showing a utility vehicle according to an embodiment of this disclosure.
Figure 2:
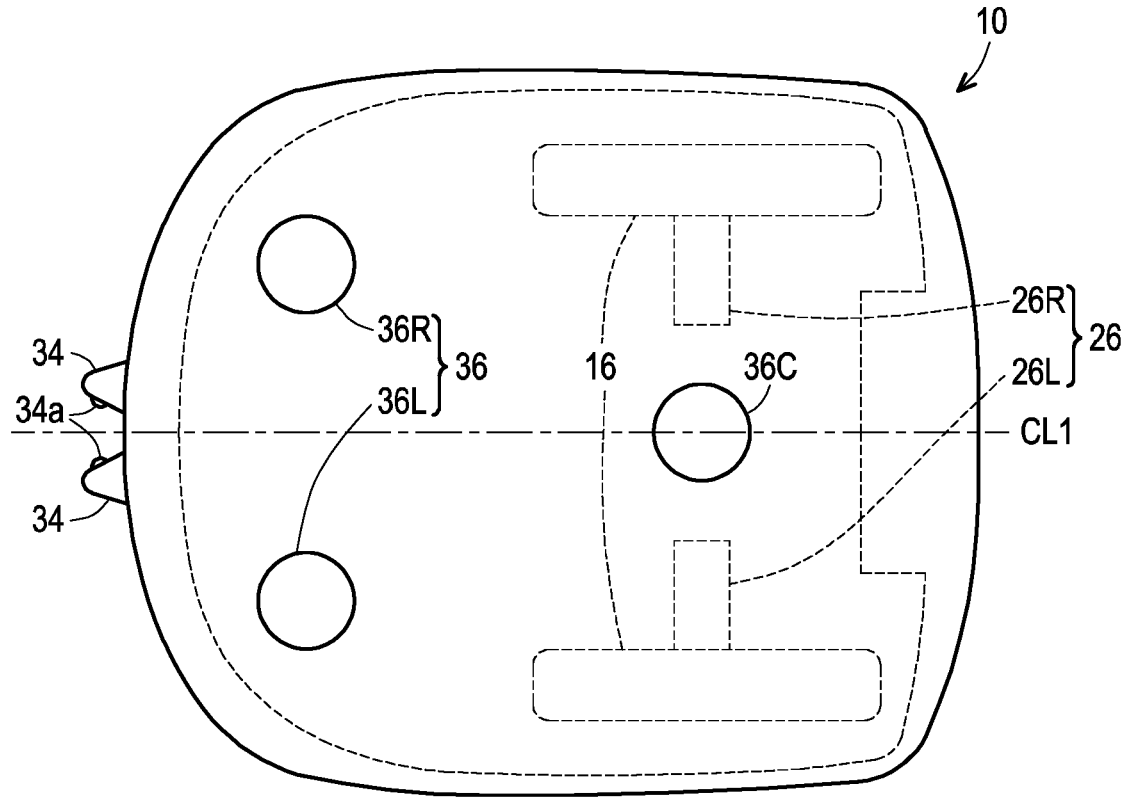
FIG. 2 is a plan view of the utility vehicle illustrated in FIG. 1.
Figure 3:
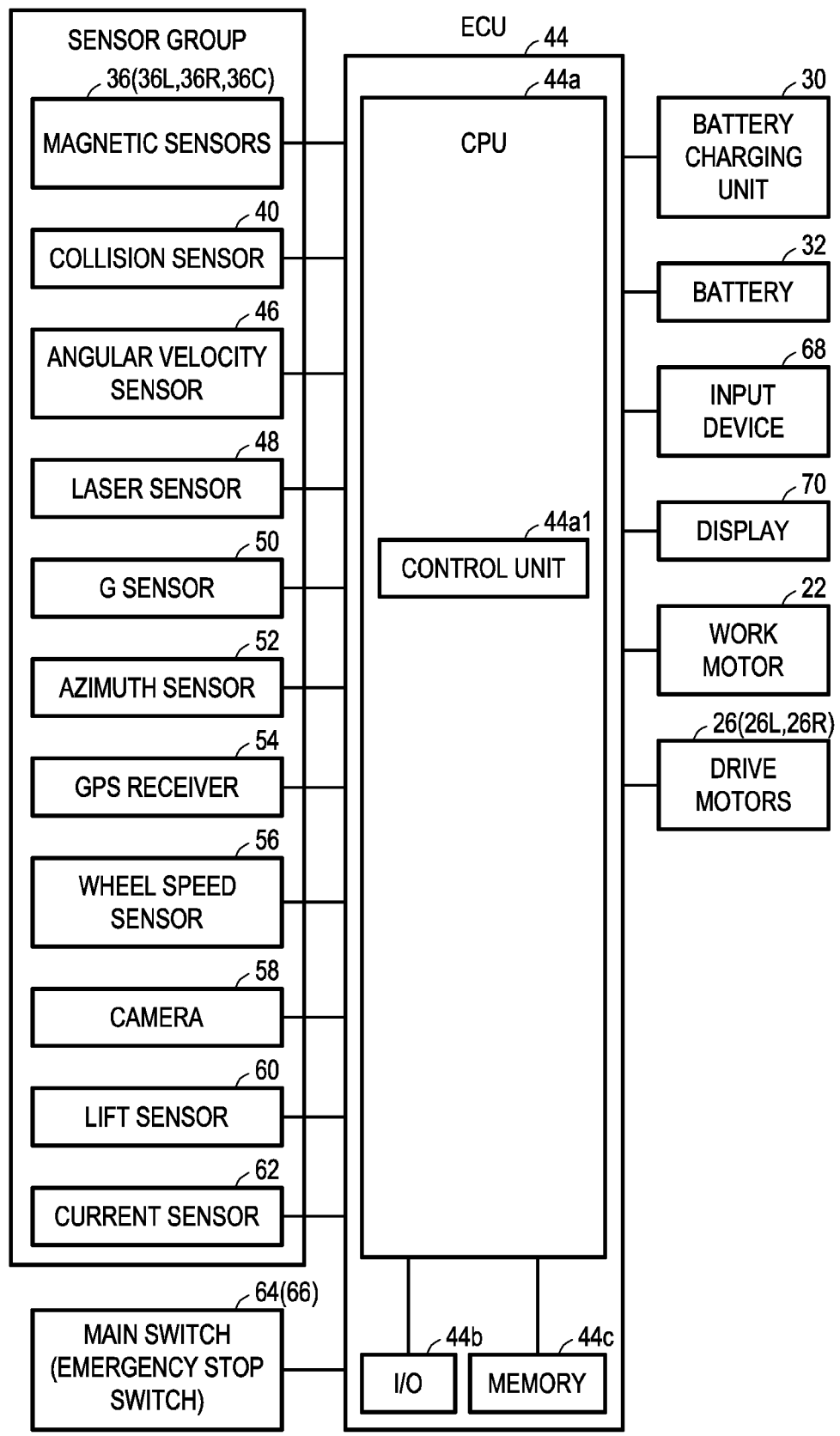
FIG. 3 is a block diagram showing inputs to an Electronic Control Unit installed in the utility vehicle illustrated in FIG. 1.

FIG. 1 is an overall schematic diagram showing a utility vehicle according to an embodiment of this disclosure, FIG. 2 is a plan view schematically illustrating the configuration of the utility vehicle illustrated in FIG. 1; and FIG. 3 is a block diagram showing the configuration of an electronic control unit (ECU) of the utility vehicle according to the present embodiment.

As shown in FIG. 1, reference symbol 10 designates a utility vehicle, more precisely an autonomously navigating utility vehicle, e.g., a mower; hereinafter called "vehicle".

The utility vehicle of the present disclosure can be embodied in the form of various types of utility vehicle and particularly as an autonomously navigating utility vehicle as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

A body 12 of the vehicle 10 comprises a chassis 12a and a frame 12b attached thereto. The vehicle 10 is equipped with relatively small diameter left and right front wheels 14 rotatably fastened to a front end of the chassis 12a through stays 12a1 and relatively large diameter left and right rear wheels 16 rotatably fastened to the chassis 12a directly.

A work unit, e.g., a mower blade (rotary blade) 20, is attached near the middle of the chassis 12a of the vehicle 10, and an electric motor (hereinafter called "work motor") 22 is installed above it. The blade 20 is connected to the electric motor 22 to be driven to rotate by the electric motor 22. The electric motor 22 is an example of a driving unit.

A blade height regulation mechanism 24 manually operable by an operator is connected to the blade 20. The blade height regulation mechanism 24 is equipped with a screw (not shown) and configured to enable the operator to regulate the height of the blade 20 above ground level GR by manually rotating the screw.

Two electric motors (hereinafter called "drive motors") 26 are attached to the chassis 12a of the vehicle 10 at a rear end of the blade 20. The drive motors 26 are connected to the left and right rear wheels 16 and rotate normally (drive the vehicle 10 to run forward) or reversely (drive the vehicle 10 to run backward) independently on the left and right, with the front wheels 14 as non-driven (free) wheels and the rear wheels 16 as driven wheels. The blade 20, work motor 22, drive motors 26 and so on are covered by the frame 12b.

The weight and size of the vehicle 10 are such that it can be transported or carried by the operator. As an example, the vehicle 10 may have a total length (forward-rearward direction length) about 710 mm, total width about 550 mm, and height about 300 mm.

A battery charging unit 30 and an onboard battery 32 are housed at the rear of the vehicle 10, and a pair of charging terminals 34 are attached to the frame 12b so as to project forward. The battery 32 comprises lithium-ion battery, for example.

The charging terminals 34 are connected to the charging unit 30 through cables, and the charging unit 30 is connected to the battery 32 by cables. The work motor 22 and the drive motors 26 are connected to the battery 32 through connecting cables and are supplied with current from the battery 32. The cables are not shown in FIG. 1.

The vehicle 10 is thus configured as a 4-wheel, electrically-powered, autonomously navigating utility vehicle. The vehicle 10 is an example of an autonomous work vehicle.

Left and right magnetic sensors 36 are installed at the front of the body 12 of the vehicle 10 at positions laterally symmetrical with respect to a center line extending in the straight forward direction of the vehicle 10. More specifically, as shown in FIG. 2, the first and second magnetic sensors 36R and 36L are installed laterally symmetrically with respect to a body center line CL of the vehicle body 12 running in the forward-rearward direction along the widthwise center of the vehicle 10. In addition, a third magnetic sensor 36C is installed on the body center line CL1 at a location remote from the sensors 36L and 36R. The magnetic sensors 36 produces an output indicating magnitude of magnetic field signal (magnetic field strength or intensity). The magnetic sensors 36R, 36L, 36C are examples of a signal detection part of the disclosure.

A collision (contact) sensor 40 is attached to the frame 12b. The collision sensor 40 outputs an ON signal when the frame 12b detaches from the chassis 12a owing to collision (contact) with an obstacle or foreign object.

A housing box (not shown) installed near the middle of the vehicle 10 houses a printed circuit board 42 carrying an ECU (Electronic Control Unit) 44, which comprises a microcomputer having CPU (microprocessor or processor) 44a, I/O 44b, and memory (ROM, RAM, EEPROM, etc.) 44c and the like. The ECU 44 is an example of a control unit.

In the vicinity of the ECU 44 are installed an angular velocity sensor (yaw-rate sensor; yaw sensor) 46 that generates an output indicating angular velocity (yaw-rate) around a center-of-gravity z-axis (vertical axis) of the vehicle 10 (whose time-integrated value indicates a turn angle around the vertical axis), a G sensor (acceleration sensor) 50 that generates an output indicating acceleration G acting on the vehicle 10 in x, y and z (3-axis) directions, a direction sensor 52 that generates an output indicating direction (azimuth) of the vehicle 10 according to terrestrial magnetism, and a GPS (Global Positioning System) receiver 54 that receives satellite-transmitted GPS signals indicating position of the vehicle 10 (the GPS receiver 54 functions as a position sensor that acquires a position of the vehicle 10). The GPS receiver 54 is an example of a Global Navigation Satellite System (GNSS) receiver, and acquires a position of the vehicle 10. The GNSS receiver is an example of a position information obtaining unit.

Wheel speed sensors 56 installed near the rear wheels 16 produce outputs indicating the wheel speeds of the rear wheels 16, and a lift sensor 60 installed between the chassis 12a and the frame 12b outputs an ON signal when the frame 12b is lifted off the chassis 12a by the operator or other worker. The vehicle 10 is equipped with a main switch 56 and an emergency stop switch 60 both operable by the operator. A current sensor 62 is installed at input/output circuit of the battery 32 and produces an output indicating consumed current of the battery 32.

A main switch 64 for inputting various commands of the operator, inter alia, start of operation, and an emergency stop switch 66 for inputting command for stopping the vehicle 10 in case of emergency are installed on the vehicle to be manipulatable by the operator. The top of the frame 12b of the vehicle 10 has a large cutaway in which an input device 68 for inputting commands of the operator and a display 70 is fitted. The input device 68 and display 70 are connected to the ECU 44. The display 70 displays working modes and the like in accordance with commands sent from the ECU 44.

As shown in FIG. 3, the outputs of the magnetic sensors 36, collision sensor 40, angular velocity sensor 46, etc., are sent to the ECU 44 through the I/O 44b. Based on the inputted data, the ECU 44 controls operation of the vehicle 10 by supplying current to the drive motor 26 from the battery 32 and by sending commands thereto through the I/O 44b.

Output shafts of the drive motors 26L and 26R are connected to rotating shafts of the left and right rear wheels 16, respectively, so as each to independently drive or rotate the left or right rear wheel 16. The drive motors 26L and 26R are configured such that they each independently rotate one of the rear wheels 16 normally (drive the vehicle 10 to run straight forward) or reversely (drive the vehicle 10 to run reverse). By establishing a difference between the rotating speeds of the left and right rear wheels 16, the vehicle 10 can be turned to an arbitrary direction.

For example, when the left and right rear wheels 16 are both rotated normally and the rotational speed of the right rear wheel 16 is greater than the rotational speed of the left rear wheel 16, the vehicle 10 turns left at a turning angle θ in accordance with the speed difference. Conversely, when the rotational speed of the left rear wheel 16 is greater than the rotational speed of the right rear wheel 16, the vehicle 10 turns right at a turning angle θ in accordance with the speed difference. When one of the left and right rear wheels 16 is rotated normally and the other reversely both at the same speed, the vehicle 10 turns on the spot (so-called "pivot-turn").

The vehicle 10 is configured to detect or recognize the working area AR based on the outputs of the aforesaid sensors, in particular the electromagnetic sensors 36 and perform the work in the working area AR.

The detection of the working area AR and the work thereat will be explained with reference to FIG. 4.

The working area AR is delineated by laying (burying) a boundary wire (electrical wire) 72 around a periphery (boundary) of the working area AR. A charging station 76 for charging the battery 22 of the vehicle 10 may be installed inside or outside of the working area AR. In FIG. 4, the charging station 76 is disposed at a location inside the working area AR. However, the disclosure is not limited thereto.

Figure 4:
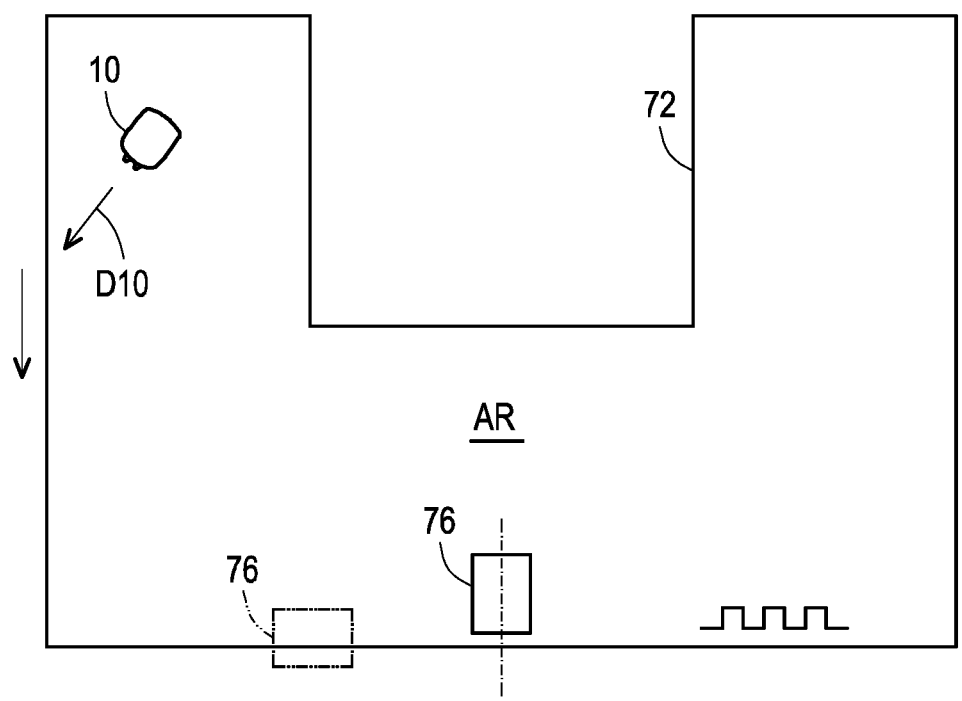
FIG. 4 is an explanatory diagram showing a working area (delimited by a boundary wire) of the utility vehicle illustrated in FIG. 1.
Figure 5:
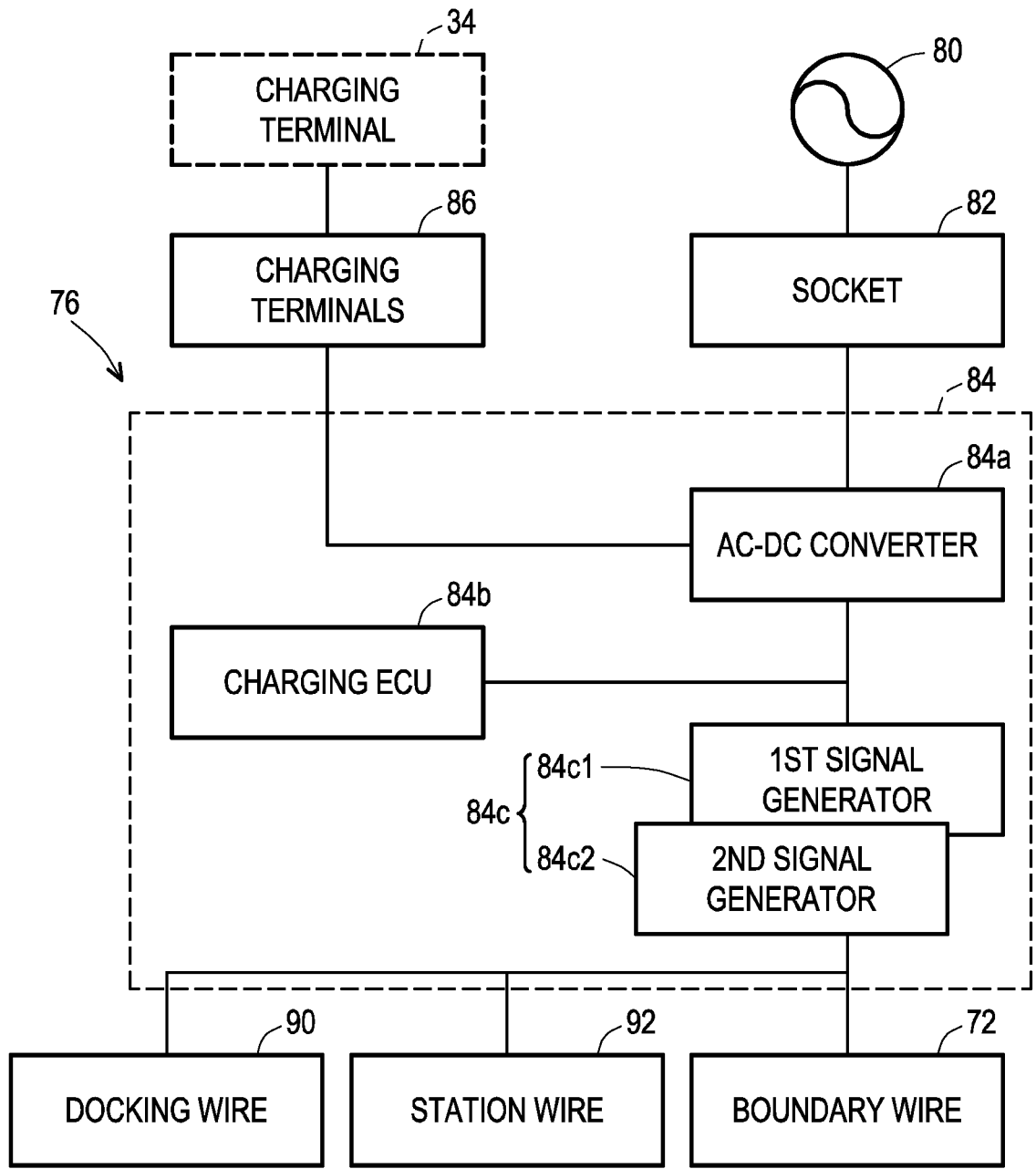
FIG. 5 is a block diagram showing configuration of a charging station of the utility vehicle shown in FIG. 4.

FIG. 5 is a block diagram showing an electrical configuration of a charging station in FIG. 4.

As shown in FIG. 5, the charging station 76 is equipped with a charger 84 connected to a commercial power supply 80 through a socket 82, and a pair of charging terminals 86 connected to the charger 84. The pair of charging terminals 86 are configured to be connectable to the pair of charging terminals 34 disposed on the vehicle 10 through the contacts 34 a (shown in FIG. 2) of the pair of charging terminals 34.

The charger 84 is equipped with an AC-DC converter 84a, a charging ECU (Electronic Control Unit) 84b also comprising a microcomputer and used to control operation of the AC-DC converter 84a, and two signal generators 84c (a first signal generator 84c1 and a second signal generator 84c2). The first signal generator 84c1 and the second signal generator 84c2 are examples of a signal generating device.

The charging station 76 is configured so that alternating current passing from the commercial power supply 80 through the socket 82 is converted to direct current and is stepped down to a suitable voltage by the AC-DC converter 84a of the charger 84 and sent to the charging terminals 86 to charge the onboard battery 32 through the charging contacts 32 and 86 when the lawnmower 10 is returned and connected to the charging station 76. The AC-DC converter 84a steps down the current to a suitable voltage in response to commands determined by the ECU 44 and sent from the charging ECU 84b.

At the same time, the output of the AC-DC converter 84 is supplied to the charging ECU 84b and signal generators 84c (comprising a first signal generator 84c1 and a second signal generator 84c2). The charging ECU 84b is configured to be capable of communicating with the ECU 44 and controls operation of the first signal generators 84c1 and the second signal generator 84c2 by sending binary data pulses.

In response thereto, the first and second signal generators 84c1, 84c2 convert the direct current stepped down by the AC-DC converter 84a into area signals in continuance sequence of pulse train and supply the generated area signals to the boundary wire 72, a docking wire 90 for guiding the vehicle 10 to a charging position, and a station wire 92 for delineating the charging station 76.

Figure 6:
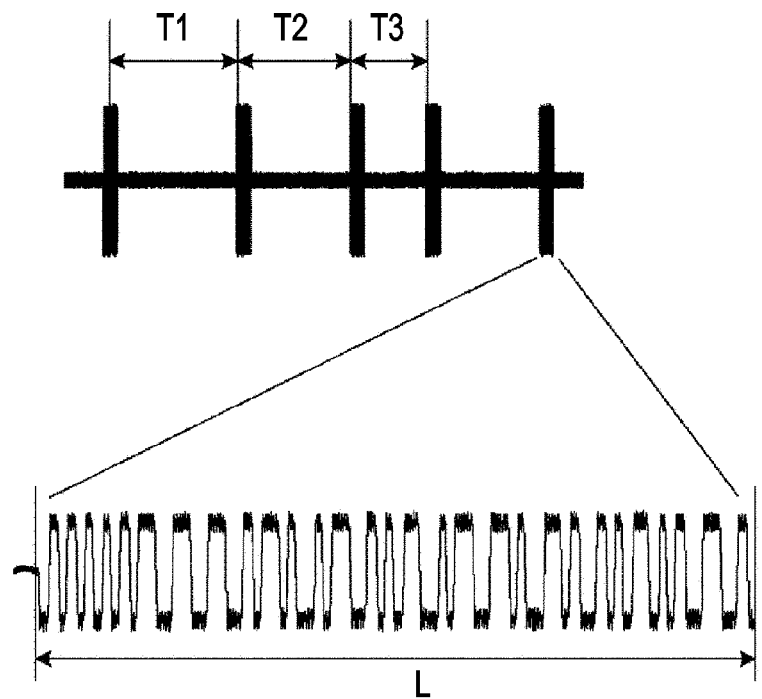
FIG. 6 is an explanatory diagram showing data signal of pulse train generated by a signal generator illustrated in FIG. 5.

FIG. 6 shows the pulse train generated by the first signal generator 84c1 to be passed through the boundary wire 72 that is corresponding to the binary data pulses sent from the charging ECU 84b. Although not shown, the pulse train signal generated by the second signal generator 84c2 may be similar to the pulse train generated by the first signal generator 84c1. However, in another embodiment of the disclosure, the pulse train signal generated by the second signal generator 84c2 may be different from the pulse train signal generated by the first signal generator 84c1. By generating different pulse train signals, different wires (such as area wire 72, guide wire 73, docking wire 90, station wire 92) may be differentiated and recognized by the vehicle 10 based on pulse train of the detected signal, and a general location of the vehicle 10 may be deduced. It should be understood, a number of the signal generators may be determined according to requirements and is not limited to the first and second signal generators 84c1, 84c2. In addition, the "wire" recited herein may refer to any wire, for example, the area wire 72, the guide wire 73, the docking wire 90, the station wire 92 and the like. In the present disclosure, for example, the guide wire 73 is configured as a shortcut wire for the vehicle 10 to return to the station 76.

The detection of the working area AR shown in FIG. 4 will be explained.

When electric current of the data signal shown in FIG. 6 is supplied to the boundary wire 72 by the first signal generator 84c1, a right-handed magnetic field is generated around the boundary wire 72 (Ampere's right-hand screw rule). The magnetic field intensity detected at this time differs depending on the total length of the boundary wire 72 and also differs with distance of the vehicle 10 from the boundary wire 72. The magnetic sensors 36L, 36R, 36C are configured to detect a signal emitted by a signal generating device such as the first and second signal generators 84c1, 84c2.

Figure 7:
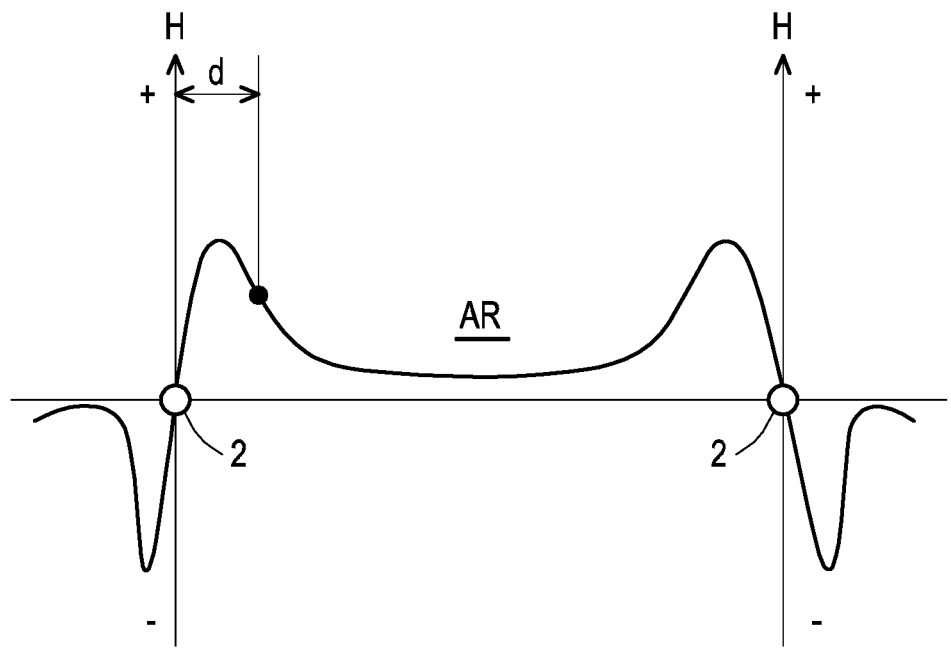
FIG. 7 is an explanatory diagram showing relationship between distance from the boundary wire and magnetic field strength generated by the data signal of FIG. 6.

FIG. 7 is a diagram showing relationship between distance d from the boundary wire 72 and magnetic field strength H. As indicated in FIG. 7, magnetic field strength H varies with distance d from the boundary wire 72. Specifically, magnetic field strength H is 0 above the boundary wire 2, positive inside the working area AR, and negative outside the same.

When work is in progress, the ECU 44 reads outputs of the magnetic sensors 36L, 36R and detects the position of the vehicle 10 in the working area AR. Specifically, the ECU 44 determines whether the vehicle 10 is inside or outside the working area AR and detects distance of the vehicle 10 from the boundary wire 72.

More specifically, the ECU 44 reads outputs of the magnetic sensors 36L, 36R and when the outputs are minus, drive the vehicle 10 to turn toward inside the working area AR at a random angle based on, for example, the output of the angular velocity sensor 46. As a result, work can be carried out inside the working area AR while the vehicle 10 is being driven to run straight forward at random direction, for example.

In the present embodiment, the vehicle 10 is controlled to operate in work mode and return mode in response to control commands sent from the ECU 44 in accordance with programs prepared beforehand and memorized in the memory 44c. In work mode, the vehicle 10 works (mows lawn or grass) while autonomously navigating in the working area AR. In return mode, the vehicle 10 is returned to the charging station 76 when the battery 32 requires charging. In work mode or return mode, the vehicle 10 is sometimes controlled to trace along the boundary wire 72. For example, this trace mode is executed before work mode to ascertain the working area AR.

Figure 8:
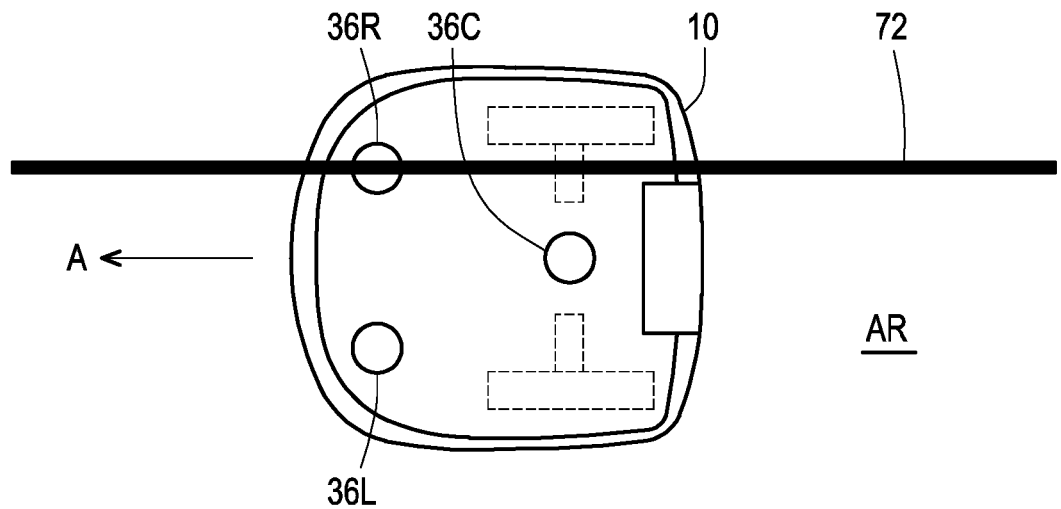
FIG. 8 is an explanatory diagram showing operation in trace mode of the vehicle illustrated in FIG. 1.

FIG. 8 is a diagram showing operation of the vehicle 1 in trace mode. As shown in FIG. 8, in trace mode the vehicle 1 is driven by commands from the ECU 44 to circuit along the boundary wire 72 with one of the pair of magnetic sensors 36R and 36L (e.g., 36L) positioned inside the boundary wire 72 and so that the other magnetic sensor (e.g., 36R) moves above the boundary wire 72 in the direction of arrow A. Specifically, the ECU 44 monitors output of the magnetic sensor 36R and controls operation of the drive motors 26L and 26R so that magnetic field strength H detected by the magnetic sensor 36R stays at 0.

For example, when magnetic field strength H detected from the output of the magnetic sensor 36R becomes positive, the vehicle 10 is turned rightward by decelerating right drive motor 26R and accelerating left drive motor 26L. On the other hand, when magnetic field strength H detected from the output of the magnetic sensor 36R becomes negative, the vehicle 10 is turned leftward by accelerating the right drive motor 26R and decelerating the left drive motor 26L. As a result, the right magnetic sensor 36R is brought near the boundary wire 72 and magnetic field strength H detected by the right magnetic sensor 36R is maintained at 0, so that the vehicle 10 can run on the boundary wire 72.

In the above embodiment, it was described where the magnetic sensor 36R detects a magnetic field signal emitted from a wire 72 disposed at a working area AR, wherein the control unit 26 controls the vehicle 10 to trace the boundary wire 72 so that magnetic field strength H detected by the magnetic sensor 36R stays at 0, such that the vehicle 10 runs on the boundary wire 72.

In another embodiment of the disclosure, the control unit 26 may control the vehicle 10 to trace the boundary wire 72 at a predetermined variable distance by steering the vehicle 10 to keep the detected magnetic field signal H within a predetermined range. The predetermined variable distance, for example, may be set between 1-2 meters, 2-5 meters, 1.3-3.6 meters, 2.0-10.0 meters and the like. However, the disclosure is not limited thereto. The predetermined variable distance may be set between other distance ranges according to requirements. The predetermined variable distance is set by keeping the detected magnetic field signal H within a predetermined range that corresponds to the target distances. The predetermined variable distance refers to, for example, a distance from the wire being traced to the body center line CL1 of the vehicle 10. In another embodiment of the disclosure, the predetermined variable distance refers to, for example, a distance from the wire to a side of the vehicle 10 that is closest to the wire. In another embodiment of the disclosure, the predetermined variable distance refers to, for example, a distance from the wire to a side of the frame 12b of the vehicle 10 that is closest to the wire. In another embodiment of the disclosure, the predetermined variable distance refers to, for example, a distance from the wire to one of the magnetic sensors 36.

Figure 9:
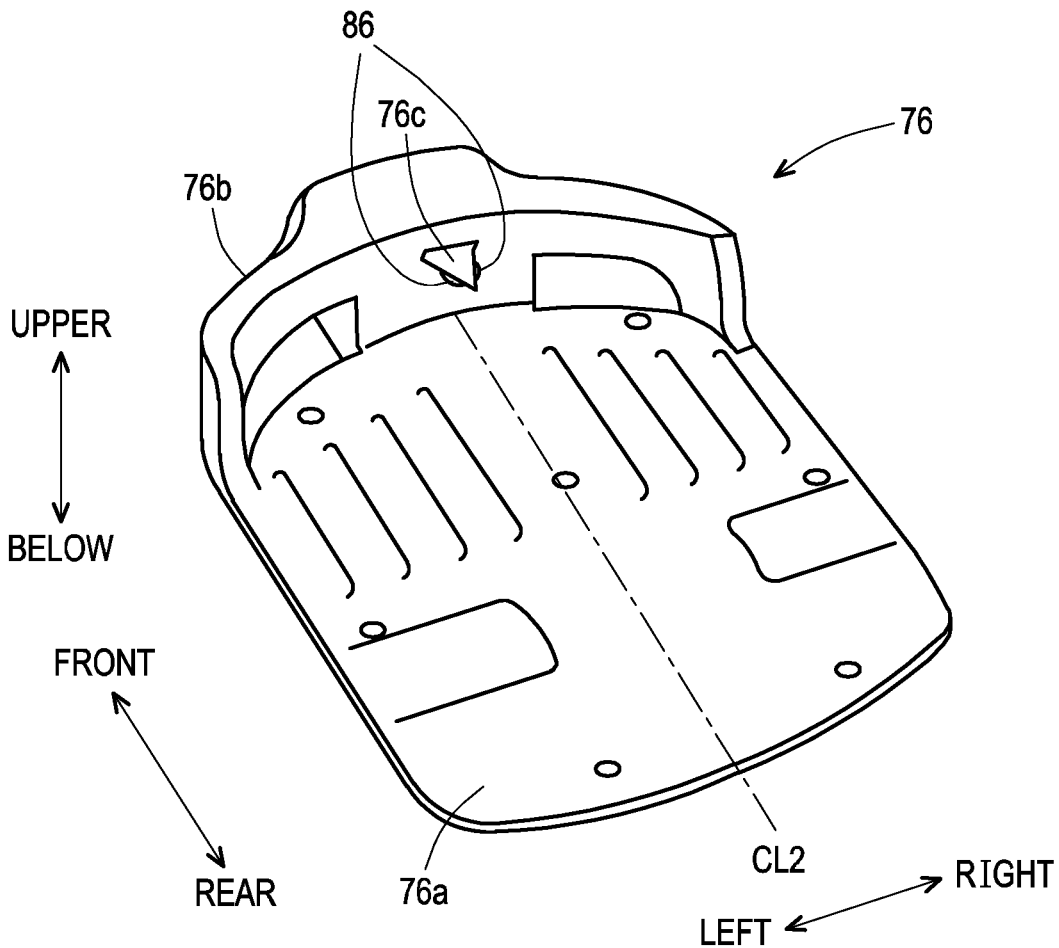
FIG. 9 is a perspective diagram illustrating the physical structure of the charging station according to an embodiment of the disclosure.

FIG. 9 is a perspective diagram illustrating the physical structure of the charging station 76 according to this embodiment. For convenience in the following, three orthogonal directions shown in the drawing are respectively defined as forward-rearward direction (length direction), lateral direction (width direction) and vertical direction (height direction) of the charging station 76.

As seen in FIG. 9, the charging station 76 has a base plate 76a of substantially the same size as the vehicle 10 for retaining the vehicle 10 during charging, a guide 76b erected at the front end of the base plate 76a for constraining position of the vehicle 10 during charging, and a substantially triangular terminal unit 76c projecting rearward from an upper and laterally middle part of the guide 76b.

The terminal unit 76c is configured to be insertable between the pair of left-right battery charging terminals 34 of the vehicle 10, and the pair of left-right terminals 86 of the charging station 76 is symmetrically provided with respect to a longitudinal direction axis CL2 passing through the center of the charging station 76, whereby the structure enables charging of the onboard battery 32 through the terminals 86 and 34.

As shown in FIG. 4, in this embodiment the charging station 76 is installed inside the working area AR, and in an orientation perpendicular to the boundary wire 72.

In the charging station 76, the aforesaid battery charging unit 84 is mounted on a circuit board (not shown) accommodated inside the guide 76b, and the battery charging unit 84 has connected thereto the docking wire 90 for guiding the vehicle 10 to the docking position for docking with the charging terminals 86 and the station wire 92 for, in advance of the docking, guiding the vehicle 10 by enabling it to recognize and approach the position of the charging station 76.

Figure 10:
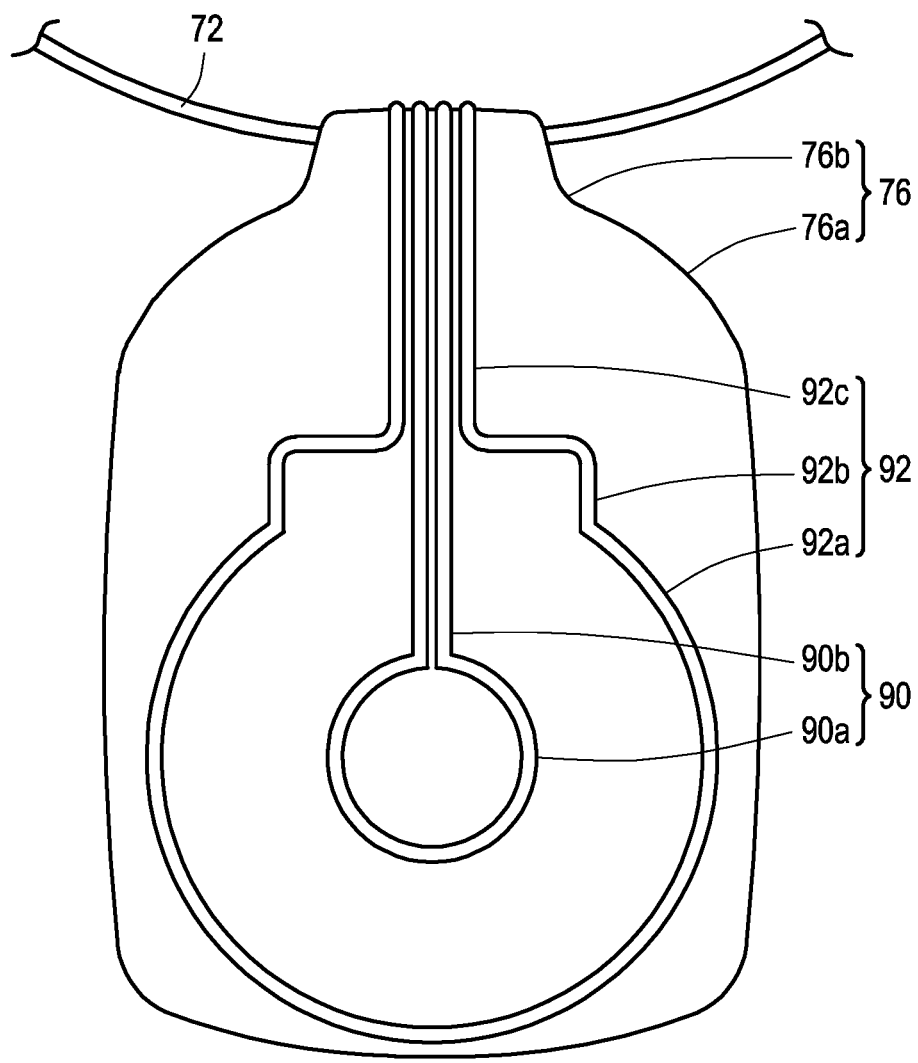
FIG. 10 is a top plan views of a base plate of the charging station shown in FIG. 9.

As illustrated FIG. 10, the charging station incorporates the docking wire 90 and station wire 92 in addition to the base plate 76a.

Figure 11:
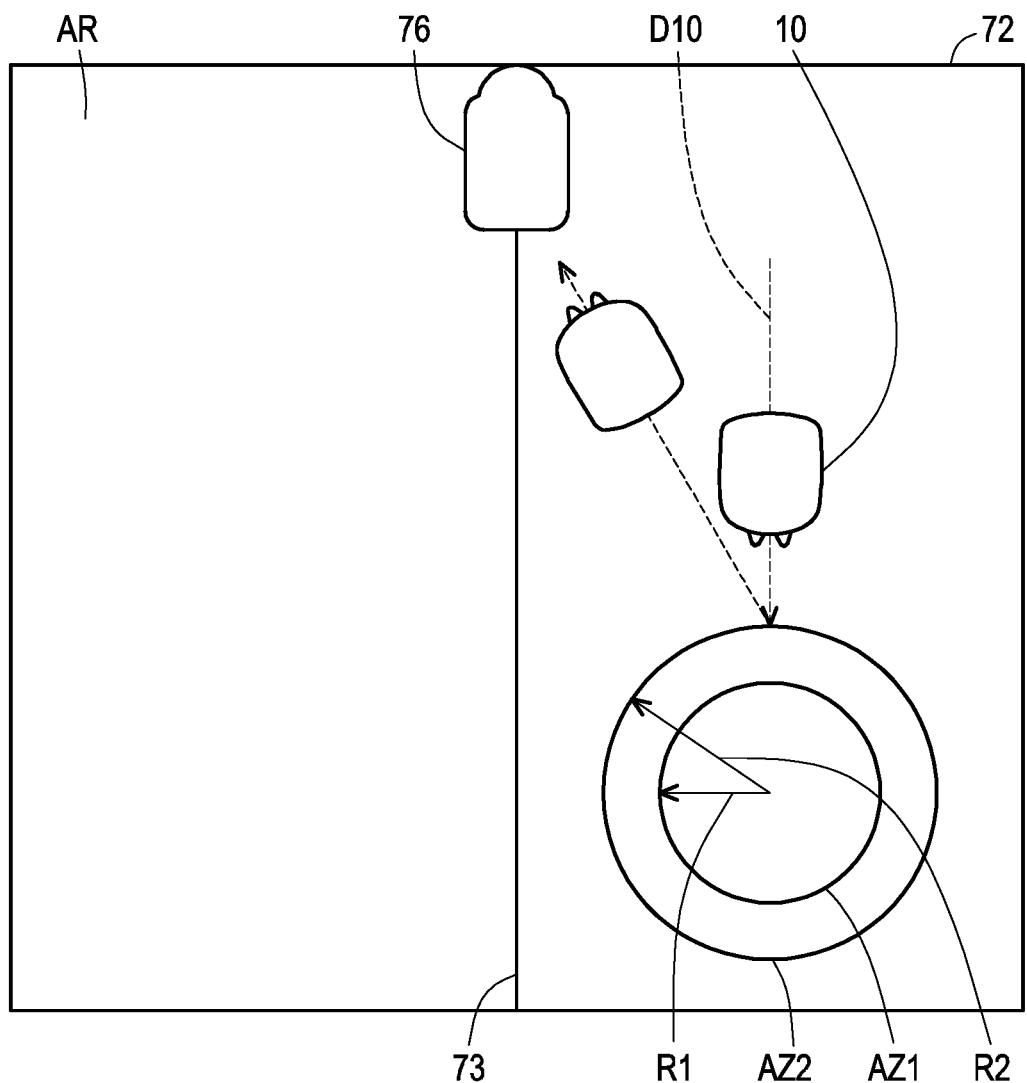
FIG. 11 is a schematic diagram illustrating a travel route of the utility vehicle according to an embodiment of the disclosure.

Referring to FIG. 11, a terminal device comprising a processor operated by a user is configured to set an entry avoidance zone AZ of the vehicle 10. The terminal device may be, for example, a smart phone. The entry avoidance zone AZ delineates an area, for example, which is undesirable for the vehicle 10 to enter. The entry avoidance zone AZ may be set, for example, by a user specifying a center position O of the entry avoidance zone AZ and a first radius R1 from the center position O. A first entry avoidance zone AZ1 and a second entry avoidance zone AZ2 shown in FIG. 11 are examples of the entry avoidance zone AZ.

The first entry avoidance zone AZ1 may be set, for example, by specifying the center position O and the first radius R1 from the center position O. When a distance between the vehicle 10 and the center position O becomes equal to or lesser than the first radius R1, it is determined that the vehicle 10 has entered the first entry avoidance zone AZ (AZ1). When a distance between the vehicle 10 and the center position O is greater than the first radius R1 and within a predetermined threshold distance from the first radius R1, it is determined that the vehicle 10 has not entered the first entry avoidance zone AZ (AZ1), but that the vehicle has approached the first entry avoidance zone AZ (AZ1). The predetermined threshold distance may be, for example, 0.1 meter, 1 meter, 1.3 meter, 1.5 meters, 2 meters, 5 meters and the like from the first radius R1. The predetermined threshold distance is not limited hereto, and may be set according to requirements.

In another embodiment of the disclosure, the second entry avoidance zone AZ2 may be set, for example, by specifying the center position O and the first radius R1 from the center position O. Then, a buffer α may be added to the first radius R1 to provide a second radius R2. In this way, R2=R1+α. When a distance between the vehicle 10 and the center position O becomes equal to or lesser than the second radius R2, it is determined that the vehicle 10 has entered the second entry avoidance zone AZ(AZ2). When a distance between the vehicle 10 and the center position O is greater than the second radius R2 and within a predetermined threshold distance from the second radius R2, it is determined that the vehicle 10 has not entered the second entry avoidance zone AZ(AZ2), but that the vehicle has approached the second entry avoidance zone. The predetermined threshold distance may be, for example, 0.1 meter, 1 meter, 1.3 meter, 1.5 meters, 2 meters, 5 meters and the like from the second radius R2. The predetermined threshold distance is not limited hereto, and may be set according to requirements.

In the present embodiment, the second entry avoidance zone AZ2 was set to be larger than the first entry avoidance zone AZ1. However, the disclosure is not limited thereto. The buffer α may be used to increase or decrease the first radius R1 according to requirements. In other words, the second radius R2 may be greater than or lesser than the first radius R1 according to requirements.

When the user sets the center position O of the entry avoidance zone AZ and the first radius R1 from the center position O, the ECU 44 sets the entry avoidance zone AZ to the first entry avoidance zone AZ1 or the second entry avoidance zone AZ2 according to requirements. The memory 44C then stores the position coordinates of the entry avoidance zone AZ. As an example, the position data or position coordinates may be transmitted in National Marine Electronics Association (NMEA) format wherein the longitudinal and latitudinal coordinates are represented by degrees and decimal minutes.

In the present embodiment, the entry avoidance zone AZ (AZ1, AZ2) are shown as a substantially circular shape. However, the disclosure is not limited thereto. The entry avoidance zone AZ (AZ1, AZ2) may take other shapes such as a triangle, square, hexagon, star shape, and/or the like.

The ECU 44 is configured to function as a zone entry judgement unit and a zone entry validation unit. The zone entry judgement unit determines whether the vehicle 10 has approached the entry avoidance zone AZ. The zone entry validation unit determines whether the determination by the zone entry judgement unit that the vehicle 10 has approached the entry avoidance zone AZ is valid or invalid. In more detail, the zone entry validation unit determines the determination by the zone entry judgement unit that the vehicle 10 has approached the entry avoidance zone AZ is valid or invalid based on whether predetermined conditions are satisfied. If the zone entry validation unit determines the determination by the zone entry judgement unit is valid, the determination by the zone entry judgement unit is set to valid. If the zone entry validation unit determines the determination by the zone entry judgement unit is invalid, the determination by the zone entry judgement unit is set to invalid.

In more detail, a travelling direction D10 of the vehicle 10 is shown in FIG. 11. The GPS receiver 54 acquires a current position of the vehicle 10. The zone entry judgement unit of the ECU 44 determines that the vehicle 10 has approached the entry avoidance zone AZ based on the current position of the vehicle 10 and the position coordinates of the entry avoidance zone AZ stored in, for example, the memory 44c.

When the zone entry judgement unit determines that the vehicle 10 has approached the entry avoidance zone AZ, and the zone entry validation unit determines that the determination by the zone entry judgement unit is valid, the control unit controls the vehicle 10 to perform an avoidance maneuver.

The avoidance maneuver may be, for example, a changing of the travelling direction D10 of the vehicle 10. In other words, the avoidance maneuver may be a maneuver in which the ECU 44 steers the vehicle 10 away from the entry avoidance zone AZ. For example, the ECU 44 turns the travelling direction D10 of vehicle 10 by a turning angle of 130 degrees. In another embodiment, the ECU 44 turns the travelling direction D10 of vehicle 10 by a turning angle of 90 degrees. The turning angles are not limited thereto and may be other angles according to requirements. In an embodiment of the disclosure, the travelling direction D10 of the vehicle 10 may be turned by a relatively large angle such as between 90 degrees and 180 degrees. In another embodiment, the travelling direction D10 of the vehicle 10 may be turned by a relatively small angle such as between 10 degrees and 90 degrees.

Figure 12:
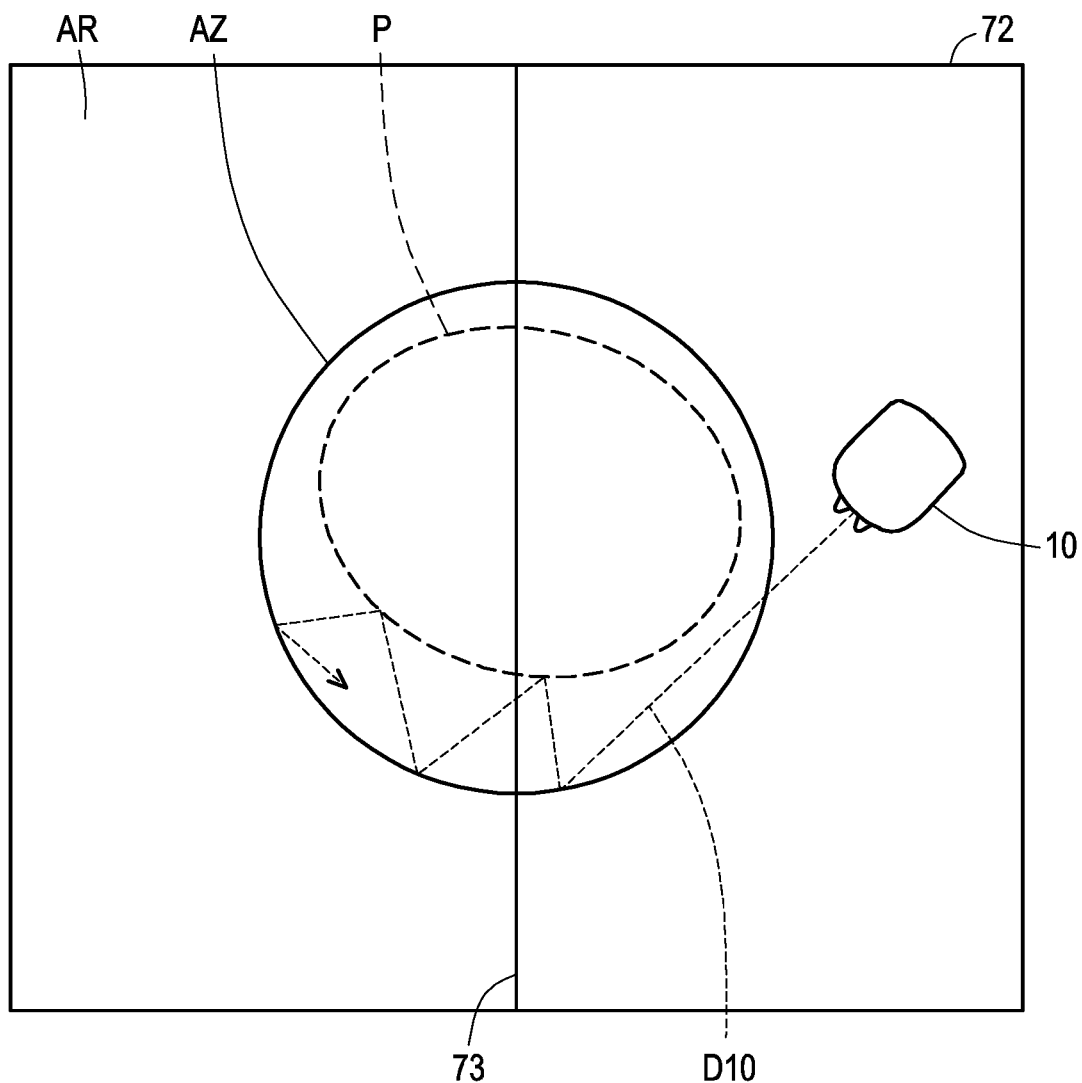
FIG. 12 is a schematic diagram illustrating an example in which the utility vehicle becomes trapped in an entry avoidance zone according to an embodiment of the disclosure.

Referring to FIG. 12, the positioning of the GPS receiver 54 may include positioning errors. That is to say, there may be a situation in which the positioning of the vehicle 10 based on the GPS receiver 54 is not accurate and includes positioning errors. Due to the positioning error of the GPS receiver, the position coordinates of the entry avoidance zone AZ relative to the position of the vehicle 10 may vary or be changing. For example, at one time instance, the vehicle 10 may mistakenly recognize the entry avoidance zone AZ as an area P shown in FIG. 12. In another time instance, the vehicle 10 may accurately recognize the entry avoidance zone AZ as the entry avoidance zone AZ, instead of the area P. In such a situation, the vehicle 10 may accidently enter the entry avoidance zone AZ due to a positioning error of the GPS receiver 54 and become trapped inside the entry avoidance zone AZ and between the area P. For example, the zone entry judgement unit may be performing the avoidance manuever consecutively inside the entry avoidance zone AZ due to the GPS receiver.

To prevent the vehicle 10 becoming trapped inside the entry avoidance zone AZ, the zone entry validation unit may determine whether the determination by the zone entry judgement unit that the vehicle 10 has approached the entry avoidance zone AZ is valid or invalid. That is to say, the ECU 44 controls the vehicle 10 to perform the avoidance maneuver when the zone entry validation unit determines that the determination by the zone entry judgement unit is valid. On the other hand, when the zone entry validation unit determines that the determination by the zone entry judgement unit is invalid, the avoidance maneuver is not performed.

Figure 13:
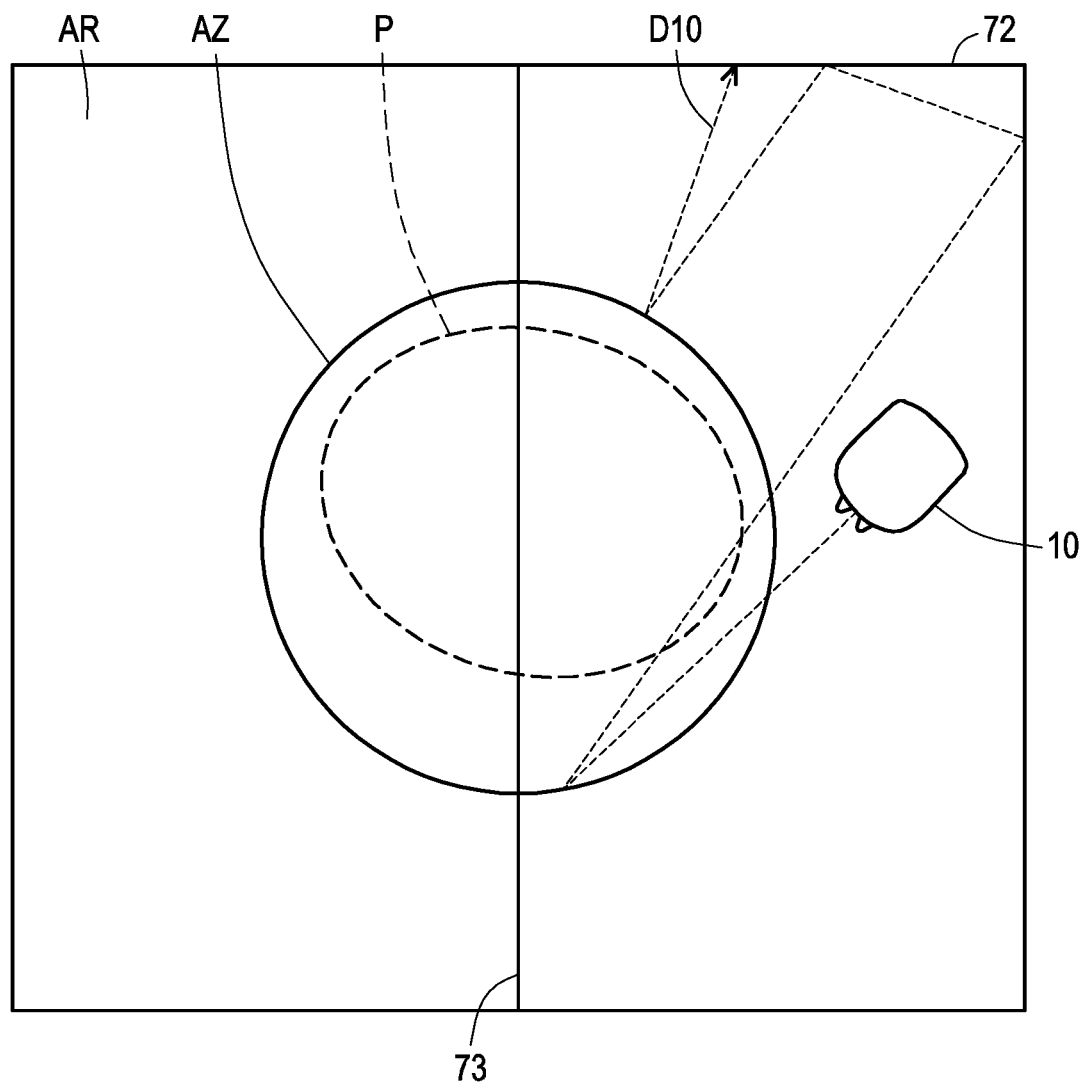
FIG. 13 is a schematic diagram illustrating a travel route of the utility vehicle according to an embodiment of the disclosure.

As shown in FIG. 1 and FIG. 2, the vehicle 10 includes magnetic sensors 36. The magnetic sensors 36 are examples of the detection part. Another example of the detection part may be the camera 58 or the laser sensor 48. Referring to FIG. 13, an example using the magnetic sensors 36 as the detection part will be described. After the vehicle 10 performs the avoidance maneuver, the zone entry validation unit determines that the determination by the zone entry judgement unit is invalid until after the detection part detects the boundary of the working area AR. That is to say, after the vehicle 10 performs the avoidance maneuver, the vehicle 10 does not perform the avoidance maneuver again until after the detection part detects the boundary of the working area AR. The magnetic sensor 36 detects a boundary of the working area AR by detecting a wire such as the area wire 72.

In more detail, when the vehicle 10 leaves the station 76 to perform work such as cutting grass, the zone entry validation unit determines that the determination by the zone entry judgement unit that the vehicle 10 has approached the entry avoidance zone is valid. While work is being performed by the vehicle 10 and the zone entry judgement unit determines that the vehicle 10 has approached the entry avoidance zone AZ, since the zone entry validation unit has determined that the determination by the zone entry judgement unit is valid, the control unit (ECU 44) controls the vehicle 10 to perform the avoidance maneuver.

After the avoidance maneuver is performed, the zone entry validation unit determines that the determination by the zone entry judgement unit that the vehicle 10 has approached the entry avoidance zone AZ is invalid. Therefore, even if the zone entry judgement unit determines that the vehicle 10 has approached the entry avoidance zone AZ or the area P, the vehicle 10 will not perform the avoidance maneuver since the zone entry validation unit has determined that the determination by the zone entry judgement unit is invalid. In other words, even when the zone entry judgement unit determines that the vehicle 10 has approached the entry avoidance zone AZ, the zone entry validation unit determines the determination by the zone entry judgement unit is invalid until after the detection part detects the boundary of the working area AR.

The zone entry validation unit determines that the determination by the zone entry judgement unit is invalid until the magnetic sensor 36 detects the boundary of the working area AR by detecting the area wire 72. After the magnetic sensor 36 detects the boundary of the working area AR by detecting the area wire 72, the zone entry validation unit determines that the determination by the zone entry judgement unit (that the autonomous work vehicle has approached the entry avoidance zone) is now valid. When the boundary of the working area AR is detected by the magnetic sensor 36, the ECU 44 controls the vehicle 10 to change the travelling direction D10 of the vehicle 10. After the ECU 44 has steered the vehicle 10 to change the travelling direction D10 of the vehicle 10, when the zone entry judgement unit determines that the vehicle 10 has approached the entry avoidance zone AZ, the ECU 44 now controls the vehicle 10 to perform the avoidance maneuver since the zone entry validation unit has determined that the determination by the zone entry judgement unit is valid.

Accordingly, the vehicle 10 may take the travel path shown in FIG. 13 even in the situation in which the positioning of the vehicle 10 based on the GPS receiver 54 is not accurate and includes positioning errors and the area P. In this way, the vehicle 10 becoming trapped inside the entry avoidance zone AZ may be prevented.

Figure 14:
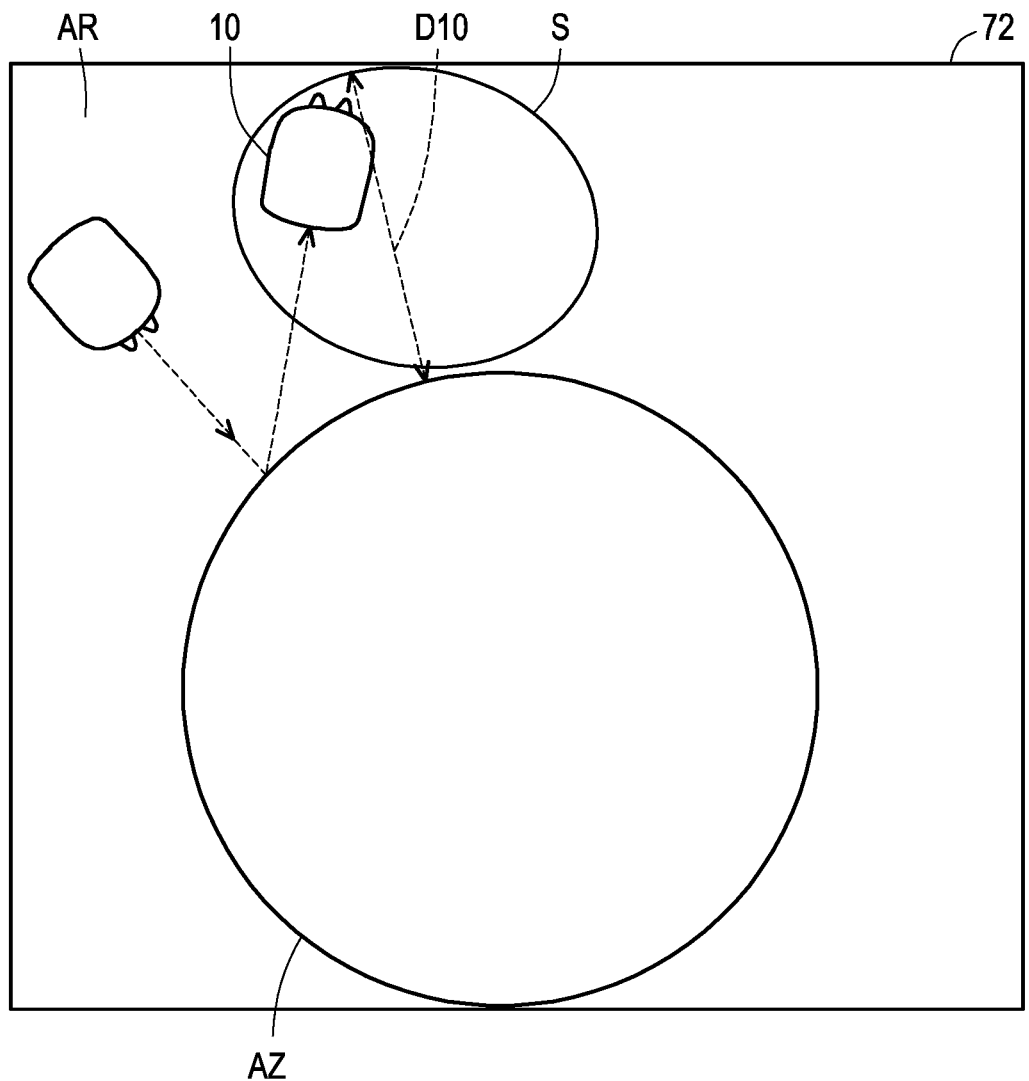
FIG. 14 is a schematic diagram illustrating an example in which the utility vehicle becomes trapped in a trap area according to an embodiment of the disclosure.

Referring to FIG. 14, the entry avoidance zone AZ is provided. There may be a situation in which the vehicle 10 becomes trapped in a trap area S. In more detail, the vehicle 10 performs the avoidance maneuver when the zone entry judgement unit determines that the vehicle 10 has approached the entry avoidance zone AZ. After the vehicle 10 performs the avoidance maneuver, the magnetic sensor 36 of the vehicle 10 detects the boundary of the working area AR by detecting the area wire 72. After the magnetic sensor 36 detects the area wire 72, the ECU 44 steers the vehicle 10 to change the travelling direction D10 of the vehicle 10. Furthermore, since the magnetic sensor 36 detected the boundary by detecting the area wire 72, the zone entry validation unit determines that the determination by the zone entry judgement unit (that the autonomous work vehicle has approached the entry avoidance zone) is valid.

Since the zone entry validation unit determined that the determination by the zone entry judgement unit (that the autonomous work vehicle has approached the entry avoidance zone) is valid, the vehicle 10 performs the avoidance maneuver a second time when the entry avoidance zone AZ is detected, and the vehicle 10 may be steered back towards the area wire 72. In this way, a situation may occur where the vehicle 10 becomes trapped in the trap area S shown in FIG. 14.

To prevent the vehicle 10 becoming trapped inside the trap area S, the zone entry validation unit may determine the determination by the zone entry judgement unit is invalid when the zone entry judgement unit determines that the vehicle 10 is in the entry avoidance zone AZ immediately after the vehicle 10 has changed the travelling direction D10 due to detecting the boundary of the working area AR.

In another embodiment, the zone entry validation unit may determine the determination by the zone entry judgement unit is invalid when the zone entry judgement unit determines that the vehicle 10 is in the entry avoidance zone AZ within a predetermined amount of time after the vehicle 10 has changed the travelling direction D10 due to detecting the boundary of the working area AR.

In another embodiment, the zone entry validation unit may determine the determination by the zone entry judgement unit is invalid when the zone entry judgement unit determines that the vehicle 10 is in the entry avoidance zone AZ within a predetermined distance after the vehicle 10 has changed the travelling direction D10 due to detecting the boundary of the working area AR.

Figure 15:
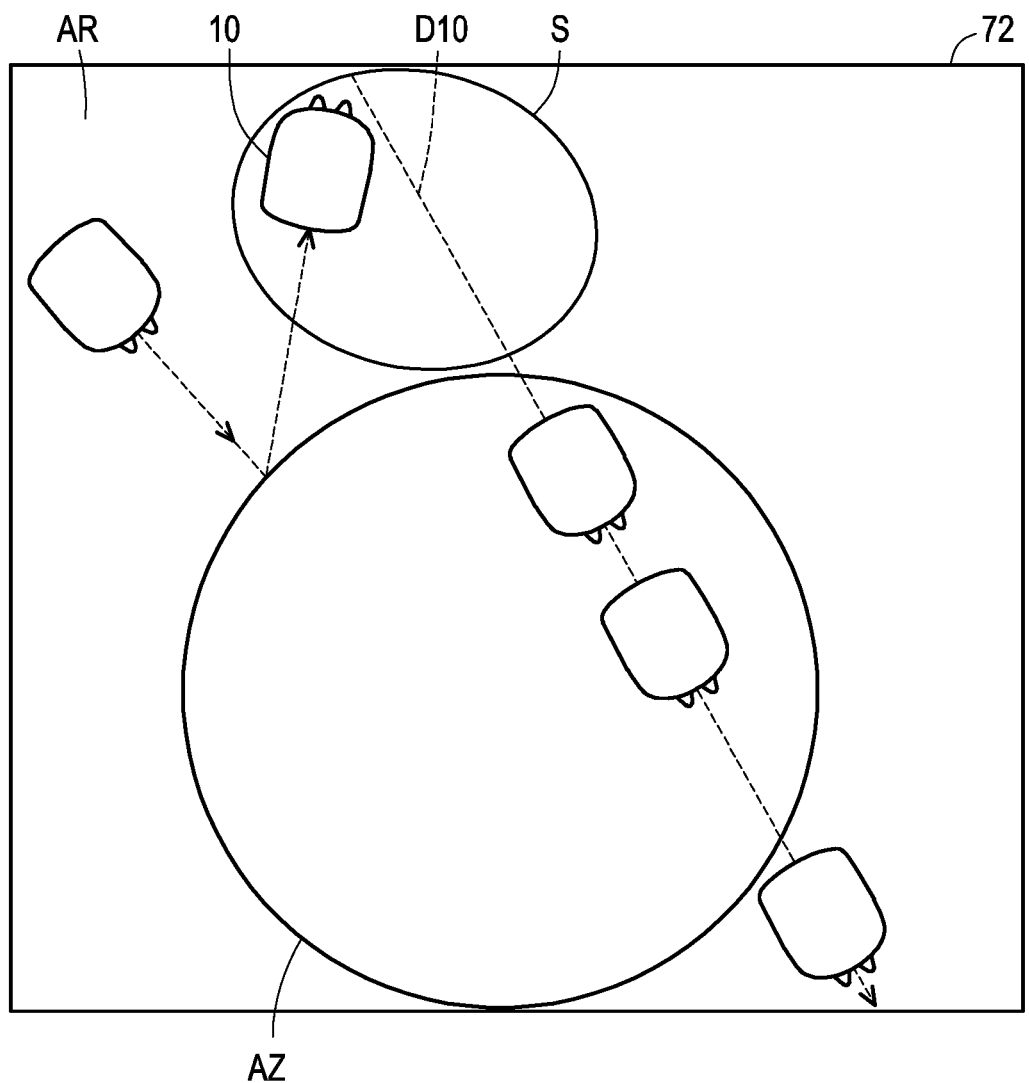
FIG. 15 is a schematic diagram illustrating a travel route of the utility vehicle according to an embodiment of the disclosure.

Accordingly, the vehicle 10 may take the travel path shown in FIG. 15 even in the situation in which the positioning of the vehicle 10 based on the GPS receiver 54 is not accurate and includes positioning errors and the trap area S. In this way, the vehicle 10 becoming trapped inside the trap area S may be prevented. As shown in FIG. 15, the zone entry validation unit determines that the determination by the zone entry judgement unit is invalid until the magnetic sensor 36 detects the boundary of the working area AR by detecting the area wire 72. That is to say, the vehicle 10 may pass through the entry avoidance zone AZ without performing the avoidance maneuver. Then, after the vehicle passes through the entry avoidance area AZ and the magnetic sensor 36 detects the boundary of the working area AR by detecting the area wire 72, the zone entry validation unit determines that the determination by the zone entry judgement unit (that the autonomous work vehicle has approached the entry avoidance zone) is valid. When the boundary of the working area AR is detected by the magnetic sensor 36, the ECU 44 controls the vehicle 10 to change the travelling direction D10 of the vehicle 10. After the ECU 44 has steered the vehicle 10 to change the travelling direction D10 of the vehicle 10, when the zone entry judgement unit determines that the vehicle 10 has approached the entry avoidance zone AZ, the ECU 44 now controls the vehicle 10 to perform the avoidance maneuver since the zone entry validation unit has determined that the determination by the zone entry judgement unit is valid.

Although some predetermined conditions have been described above, the disclosure is not limited thereto. In another embodiment of the disclosure, the zone entry validation unit may determine the determination by the zone entry judgement unit is invalid when the work unit is not working. For example, the zone entry validation unit may determine the determination by the zone entry judgement unit is invalid when the vehicle 10 is not cutting grass. In other words, the zone entry validation unit determines that the determination by the zone entry judgement unit (that the autonomous work vehicle has approached the entry avoidance zone) is valid only when the vehicle 10 is working (example, cutting grass)

Figure 16:
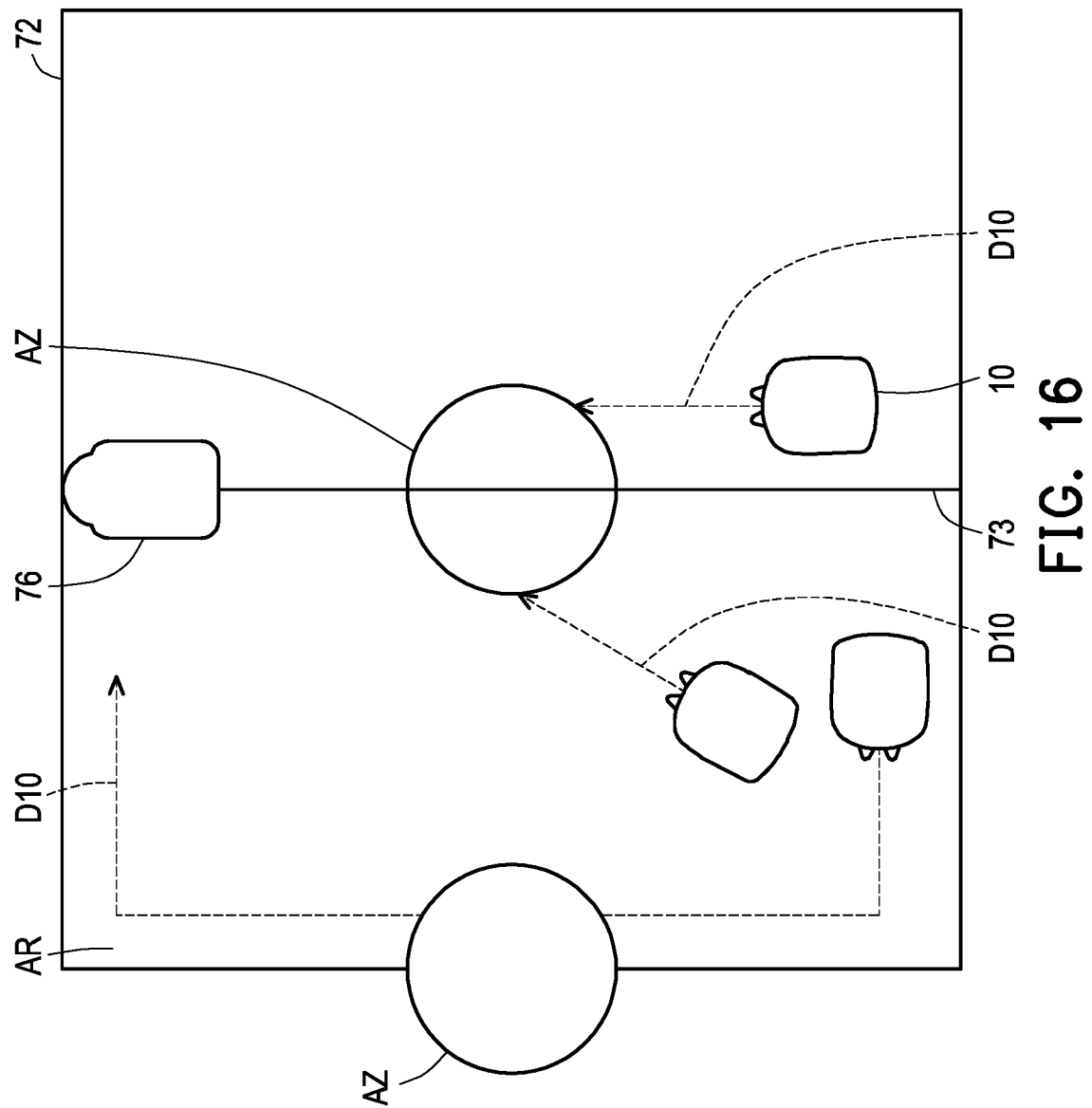
FIG. 16 is a schematic diagram illustrating an example in which the entry avoidance zone is prohibited to be set at a predetermined region.

Next, referring to FIG. 16, an embodiment in which the entry avoidance zone AZ is prohibited to be set at a predetermined region from a station 76 is described. As shown in FIG. 16, a user may attempt to set the entry avoidance zone AZ near a wire such as the boundary wire 72 and the shortcut wire 73, or near the station 76. If the entry avoidance zone AZ is set near the wire or near the station 76, the entry avoidance zone AZ may interfere with the vehicle 10 tracing the wire in trace mode and may inhibit the vehicle 10 from returning to the station 76. Accordingly, in an embodiment of the disclosure, the entry avoidance zone AZ may be prohibited from being set near the station 76. For example, the entry avoidance zone AZ may be prohibited from being set within a 2 meter radius of the station 76. However, the entry avoidance zone AZ may be prohibited from being set within other radius distances of the station 76.

Figure 17:
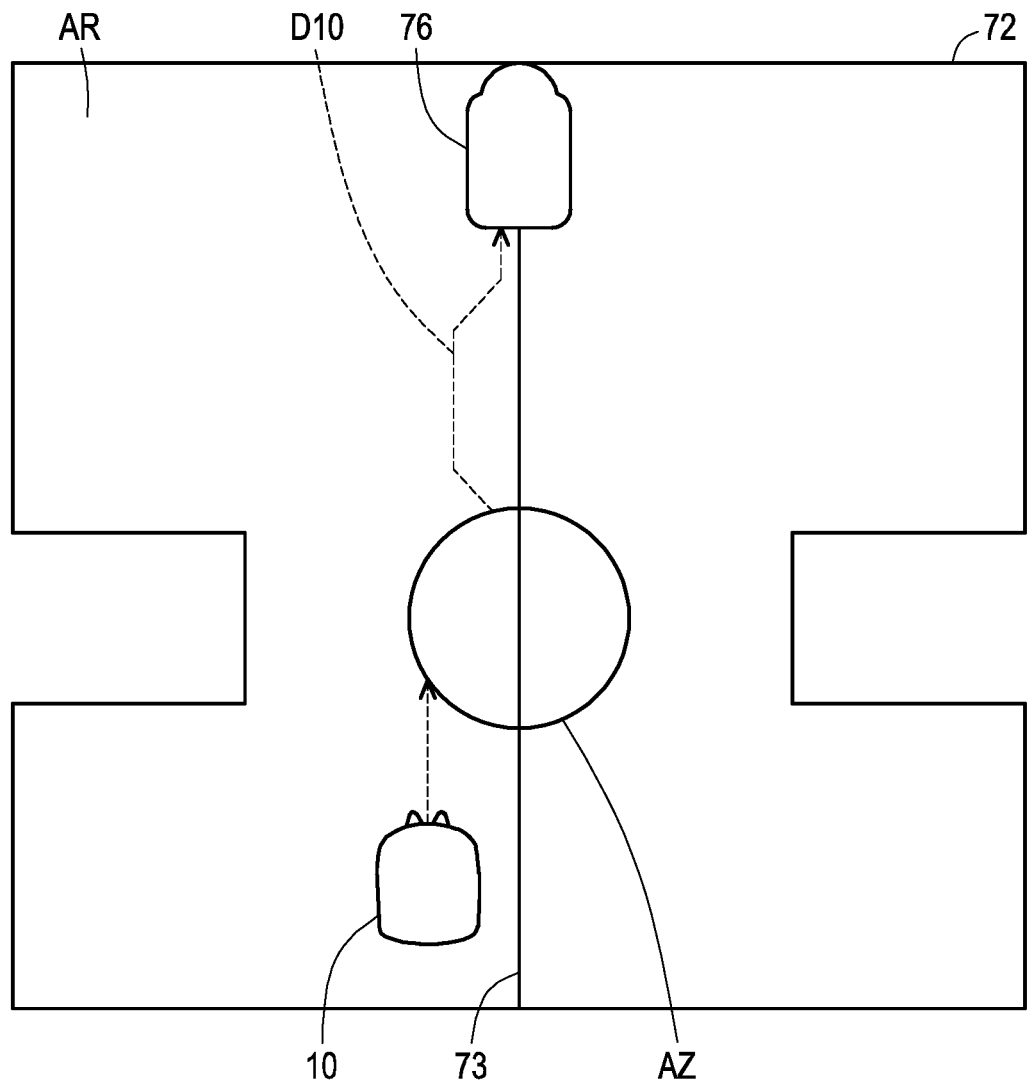
FIG. 17 is a schematic diagram illustrating an example in which the entry avoidance zone is prohibited to be set at a predetermined region.

FIG. 17 shows another embodiment of the disclosure in which the entry avoidance zone AZ is prohibited to be set at a narrow portion of the working area AR. If the entry avoidance zone AZ is set at the narrow portion of the working area AR, the entry avoidance zone AZ may hinder the travelling of the vehicle 10 from returning to the station 76. Accordingly, in an embodiment of the disclosure, the entry avoidance zone AZ may be prohibited from being set near or at the narrow portion of the working area AR.

In another embodiment, the entry avoidance zone AZ may be prohibited from being set within a 1 meter radius of the wire such as the boundary wire 72 or the shortcut wire 73. The above described radiuses are examples only, and may be set according to requirements.

The above described are some embodiments of the disclosure only, and the disclosure is not limited thereto. That is to say, according to requirements, there may be embodiments in which the entry avoidance zone AZ may be set near the station 76 and/or near the boundary wire 72 or the shortcut wire 73 and the like.

The predetermined region where the entry avoidance zone AZ is prohibited from being set may be displayed on the terminal device to inform the user. In another embodiment of the disclosure, a location of the wires may be obtained by GPS, and the wire location may be integrated with a map and displayed on a display of the terminal device. The terminal device may be, for example, a smart phone. However, the disclosure is not limited thereto and the terminal device may be a computer, a tablet PC and/or the like.

The entry avoidance zone AZ have been described above. In an embodiment of the disclosure, the entry avoidance zone AZ may be set for a temporary period of time. For example, the entry avoidance zone AZ may be specified to be effective for 1 hour, 1 day, 1 week, 1 month. In another embodiment of the disclosure the entry avoidance zone AZ may be permanent until deleted from the setting. The temporary time periods are not limited thereto and may be set to other values according to requirements.

In the above described embodiments, the vehicle 10 that is a robotic lawnmower including a blade for cutting grass was described. However, the disclosure is not limited thereto, and the vehicle 10 may be a cultivator for farming, a snow plow for plowing snow, a transport vehicle for transporting goods, or the like.

Although embodiments of a travel route control of the autonomous work vehicle using a global navigation satellite system (GNSS) of the disclosure have been described above based on some examples, the disclosure is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An autonomous work vehicle, comprising:
a detection part, comprising a sensor, detecting a boundary of a working area;
a position information obtaining unit, comprising a GNSS receiver, acquiring a position of the autonomous work vehicle;
a driving unit;
a memory, storing position coordinates used to establish an entry avoidance zone;
a control unit, comprising a processor, configured to function as:
a zone entry judgement unit, determining whether the autonomous work vehicle has approached the entry avoidance zone;
a zone entry validation unit, determining whether the determination by the zone entry judgement unit that the autonomous work vehicle has approached the entry avoidance zone is valid,
wherein when the zone entry judgement unit determines that the autonomous work vehicle has approached the entry avoidance zone, and the zone entry validation unit determines that the determination by the zone entry judgement unit is valid, the control unit controls the autonomous work vehicle to perform an avoidance maneuver,
wherein after the autonomous work vehicle performs the avoidance maneuver, the zone entry validation unit determines the determination by the zone entry judgement unit is valid after the detection part detects the boundary of the working area.

2. The autonomous work vehicle according to claim 1, wherein when the zone entry judgement unit determines that the autonomous work vehicle has approached the entry avoidance zone, the zone entry validation unit determines the determination by the zone entry judgement unit is invalid until after the detection part detects the boundary of the working area.

3. The autonomous work vehicle according to claim 2, wherein when the boundary of the working area is detected by the detection part, the control unit controls the autonomous work vehicle to change a travelling direction of the autonomous work vehicle,
wherein the zone entry validation unit determines the determination by the zone entry judgement unit is invalid when the zone entry judgement unit determines that the autonomous work vehicle is in the entry avoidance zone immediately after the autonomous work vehicle has changed the travelling direction due to detecting the boundary of the working area.

4. The autonomous work vehicle according to claim 1, further comprising:
a work unit including a blade;
wherein the zone entry validation unit determines the determination by the zone entry judgement unit is invalid when the work unit is not working.

5. The autonomous work vehicle according to claim 1, wherein the avoidance maneuver is steering the autonomous work vehicle away from the entry avoidance zone.

6. A terminal device, comprising:
a processor configured to set an entry avoidance zone of an autonomous work vehicle,
wherein the entry avoidance zone is set by specifying a center position of the entry avoidance zone and a radius from the center position, wherein the autonomous work vehicle comprises:
- a detection part, comprising a sensor, detecting a boundary of a working area;
- a position information obtaining unit, comprising a GNSS receiver, acquiring a position of the autonomous work vehicle;
- a driving unit;
- a memory, storing position coordinates used to establish an entry avoidance zone;
- a control unit, comprising a processor, configured to function as:
  - a zone entry judgement unit, determining whether the autonomous work vehicle has approached the entry avoidance zone;
  - a zone entry validation unit, determining whether the determination by the zone entry judgement unit that the autonomous work vehicle has approached the entry avoidance zone is valid,
- wherein when the zone entry judgement unit determines that the autonomous work vehicle has approached the entry avoidance zone, and the zone entry validation unit determines that the determination by the zone entry judgement unit is valid, the control unit controls the autonomous work vehicle to perform an avoidance maneuver,
- wherein after the autonomous work vehicle performs the avoidance maneuver, the zone entry validation unit determines the determination by the zone entry judgement unit is valid after the detection part detects the boundary of the working area.

7. The terminal device according to claim 6, wherein the entry avoidance zone is prohibited to be set at a predetermined region from a station.

8. An autonomous work vehicle, comprising:
- a detection part, comprising a sensor, detecting a boundary of a working area;
- a position information obtaining unit, comprising a GNSS receiver, acquiring a position of the autonomous work vehicle;
- a driving unit;
- a memory, storing position coordinates used to establish an entry avoidance zone;
- a control unit, comprising a processor, configured to function as:
  - a zone entry judgement unit, determining whether the autonomous work vehicle has entered the entry avoidance zone;
  - a zone entry validation unit, determining whether the determination by the zone entry judgement unit that the autonomous work vehicle has entered the entry avoidance zone is valid,
- wherein when the zone entry judgement unit determines that the autonomous work vehicle has entered the entry avoidance zone, and the zone entry validation unit determines that the determination by the zone entry judgement unit is valid, the control unit controls the autonomous work vehicle to perform an avoidance maneuver,
- wherein after the autonomous work vehicle performs the avoidance maneuver, the zone entry validation unit determines the determination by the zone entry judgement unit is valid after the detection part detects the boundary of the working area.

9. The autonomous work vehicle according to claim 8,
- wherein when the zone entry judgement unit determines that the autonomous work vehicle has entered the entry avoidance zone, the zone entry validation unit determines the determination by the zone entry judgement unit is invalid until after the detection part detects the boundary of the working area.

10. The autonomous work vehicle according to claim 9,
- wherein when the boundary of the working area is detected by the detection part, the control unit controls the autonomous work vehicle to change a travelling direction of the autonomous work vehicle,
  - wherein the zone entry validation unit determines the determination by the zone entry judgement unit is invalid when the zone entry judgement unit determines that the autonomous work vehicle is in the entry avoidance zone immediately after the autonomous work vehicle has changed the travelling direction due to detecting the boundary of the working area.

11. The autonomous work vehicle according to claim 8, further comprising:
- a work unit including a blade;
- wherein the zone entry validation unit determines the determination by the zone entry judgement unit is invalid when the work unit is not working.

12. The autonomous work vehicle according to claim 8, wherein the avoidance maneuver is steering the autonomous work vehicle away from the entry avoidance zone.

* * * * *